United States Patent [19]

Litzenburger et al.

[11] Patent Number: 4,596,587

[45] Date of Patent: Jun. 24, 1986

[54] SEPARATION OF A MIXTURE WHICH CONSISTS OF ORGANIC COMPOUNDS AND WATER AND IS OBTAINED IN SOLVENT RECOVERY BY ADSORPTION AND DESORPTION

[75] Inventors: Wolfgang Litzenburger, Hassloch; Gerhard Janisch, Ludwigshafen, both of Fed. Rep. of Germany

[73] Assignee: BASF Aktiengesellschaft, Fed. Rep. of Germany

[21] Appl. No.: 645,756

[22] Filed: Aug. 30, 1984

[30] Foreign Application Priority Data

Sep. 2, 1983 [DE] Fed. Rep. of Germany ....... 3331693

[51] Int. Cl.$^4$ ............................................. B01D 53/04
[52] U.S. Cl. ......................................... 55/59; 210/634
[58] Field of Search ............... 210/664, 677, 689, 634, 210/805; 55/59, 61

[56] References Cited

U.S. PATENT DOCUMENTS

| | | | |
|---|---|---|---|
| 2,996,558 | 8/1961 | Feldbauer | 210/677 |
| 3,368,325 | 2/1968 | Sanders | 55/59 |
| 3,448,042 | 6/1969 | Mattia et al. | 210/664 |
| 4,021,211 | 5/1977 | Turek et al. | 55/59 |
| 4,372,857 | 2/1983 | Matthews et al. | 210/689 |

Primary Examiner—Ivars Cintins
Attorney, Agent, or Firm—Keil & Weinkauf

[57] ABSTRACT

A mixture which consists of organic compounds and water and is obtained in solvent recovery by adsorption and desorption is separated by a process in which the water is removed from the said mixture (3) in an extraction column (1) by means of a highly concentrated alkali solution (4) (extracting agent), the resulting dilute alkali solution (6) (extracting agent) is then evaporated down in an evaporator (7) by means of added steam (8), the steam (9) formed in this procedure is fed to the adsorbers (2) for desorption of the organic compounds, the resulting highly concentrated alkali solution (4) is recycled to the extraction column (1), and the anhydrous organic compounds (5) are removed.

5 Claims, 1 Drawing Figure

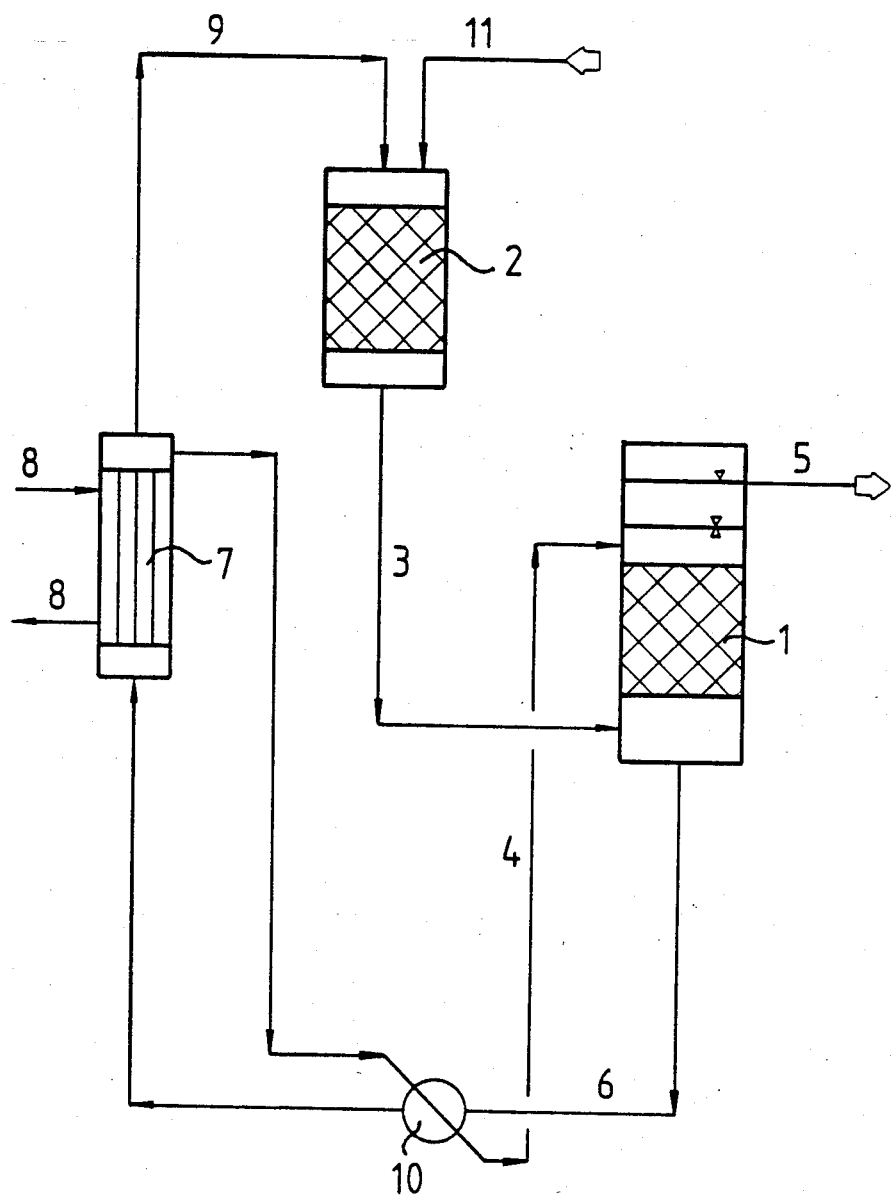

SEPARATION OF A MIXTURE WHICH CONSISTS OF ORGANIC COMPOUNDS AND WATER AND IS OBTAINED IN SOLVENT RECOVERY BY ADSORPTION AND DESORPTION

The present invention relates to a process for separating a mixture which consists of organic compounds and water and is obtained in solvent recovery for adsorption and desorption.

In the recovery of solvents from waste gases by adsorption methods, a solvent/water mixture is obtained when the adsorbed material is desorbed by means of steam.

It is known that the mutually soluble components water and solvent, which are obtained in the desorption process, can be separated by rectification. If, moreover, the solvent/water mixture possesses an azeotropic point, the solvent can be dried until the desired equilibrium concentration is reached, this being done, for example, via a two-pressure distillation or subsequent drying of the azeotropic mixture from the rectification column by means of an alkali solution, an acid or a salt solution.

However, these procedures have the following disadvantages: on the one hand, the two-pressure distillation involves relatively expensive apparatus and high energy consumption, while, on the other hand, subsequent drying by means of alkali solution, acid or salt solution necessitates expensive disposal procedures and hence high operating costs. Furthermore, the steam employed in the desorption procedure must subsequently be removed as waste water containing traces of solvents, and, in the event of a breakdown in the procedure, the environment may be adversely affected.

It is an object of the present invention to overcome the above disadvantages.

We have found that this object is achieved, in accordance with the invention, if the water is removed from the mixture of organic compounds and water in an extraction column by means of a highly concentrated alkali solution, the resulting dilute alkali solution is then evaporated down in an evaporator by means of added steam, the steam formed in this procedure is fed to the absorbers for desorption of the organic compounds, the resulting highly concentrated alkali solution is recycled to the extraction column, and the anhydrous organic compounds are removed.

An embodiment of the invention is shown in the drawing and is described in detail below. The drawing shows a flow diagram of the process according to the invention.

The solvent/water mixture 3 obtained from the absorber 2 after the desorption procedure is fed to the bottom of extraction column 1, and concentrated alkali solution 4 is fed to the top of this column. A predetermined concentration and a predetermined flow rate of the alkali solution 4 makes it possible to take off the solvent 5 with a residual content of water of about 1% at the top of the extraction column 1, while a dilute alkali solution 6 is removed from the bottom of this column. This dilute alkali solution 6 is evaporated down in evaporator 7 by means of added steam 8 to the concentration at which the alkali solution 4 is recycled to extraction column 1. The steam 9 obtained during the evaporation of the alkali solution 6 is recycled to the adsorber 2, as desorption steam. The amount of water (about 1%) removed together with the solvent 5 is fed in externally as fresh steam 11, upstream from the desorption.

In order to reduce the amount of added steam 8, which is required for evaporating down the dilute alkali solution 6, it is advantageous, according to the invention, to heat up the dilute alkali solution 6, which is at a low temperature, by means of the concentrated alkali solution 4, which is at a high temperature, this being done in heat exchanger 10 by a countercurrent procedure. According to the invention, it is also advantageous to carry out the evaporation of the dilute alkali solution (extracting agent) under superatmospheric pressure, in order to feed the resulting steam under superatmospheric pressure directly to the adsorbers. In order to reduce the evaporation temperature, it may sometimes be advantageous to carry out the evaporation of the dilute alkali solution (extracting agent) under reduced pressure. If the extracting agent is evaporated down under atmospheric or reduced pressure, it is necessary, according to the invention, for the resulting steam 9 (desorption steam) to be brought to the superatmospheric pressure required for the desorption, by means of intermediate commercial vapor compressors and/or steam superheaters.

The process according to the invention can be carried out, for example, as follows. 1727 kg/h of solvent and 3648 kg/h of water at about 20° C. are fed from the adsorber into the bottom of the extraction column. 7337 kg/h of KOH and 6004 kg/h of water at about 50° C. are introduced at the top of this column. After phase exchange inside the extraction column, 1727 kg/h of solvent and 15 kg/h of water are taken off at the top, and 7337 kg/h of KOH and 9637 kg/h of water at about 38° C. are taken off at the bottom and are fed to the evaporator. 3633 kg/h of water pass, as desorption steam at about 175° C., from the evaporator to the adsorber, and the abovementioned 7337 kg/h of KOH and 6004 kg/h of water are cooled from about 175° C. to about 50° C. by means of the heat exchanger, while the dilute alkali solution fed to the evaporator is heated up from about 38° C. to about 118° C. The 15 kg/h of water removed from the process together with the solvent are recycled to the process as fresh steam. The steam which remains in the active carbon bed of the adsorber during the desorption and is expelled when this bed is dried must be introduced in addition to the desorption steam.

The particular advantages obtained with the novel process are a minimization of the cost of disposing of the alkali solution and a reduction in the energy costs. At the same time, the novel process results in improved environmental protection, since no waste water has to be removed from the process.

We claim:

1. In an adsorption-desorption method for recovering solvents from waste gases wherein activated carbon is used as the adsorbent with steam being employed as the desorbent and wherein the desorbate is obtained in the form of a solvent/water mixture; the improvement being the provision of a means for removing water from said mixture by a continuous process which comprises:
   (a) feeding said solvent/water mixture into the bottom of an extraction column while a water extracting agent consisting of an alkali solution at a predetermined concentration is being simultaneously fed into the top thereof at a predetermined rate;
   (b) taking-off a substantially water-free solvent product from the upper end of said extraction column while removing alkali solution diluted with water from the lower-end thereof;

(c) forwarding said diluted alkali solution to an evaporator where water is removed therefrom to restore said predetermined concentration; and (d) recycling the concentrated alkali solution to said extraction column while the steam generated in said evaporation is recycled to the adsorption-desorption operation for use as a desorbant.

2. A process as claimed in claim 1, wherein the extracting agent is evaporated down under superatmospheric pressure.

3. A process as claimed in claim 1, wherein the extracting agent is evaporated down under reduced pressure.

4. A process as claimed in claim 1, wherein the steam obtained in the evaporation of the extracting agent is brought to a higher pressure by means of intermediate vapor compressors and/or steam superheaters.

5. The process in accordance with claim 1, wherein the dilute extracting agent being forwarded to the evaporator from the extraction column is brought to an elevated temperature by heat exchange with the concentrated extracting agent being recycled back to the extraction column from the evaporator.

* * * * *